United States Patent [19]
Lee et al.

[11] Patent Number: 5,337,085
[45] Date of Patent: Aug. 9, 1994

[54] CODING TECHNIQUE FOR HIGH DEFINITION TELEVISION SIGNALS

[75] Inventors: Lin-Nan Lee, Potomac; Ashok K. Rao, Germantown; Sanjai Bhargava, Bethesda, all of Md.

[73] Assignee: Comsat Corporation, Bethesda, Md.

[21] Appl. No.: 866,851

[22] Filed: Apr. 10, 1992

[51] Int. Cl.$^5$ .............................................. H04N 7/137
[52] U.S. Cl. ........................ 348/398; 348/402; 348/410; 348/414; 348/416; 348/417
[58] Field of Search ............ 358/133, 12, 13, 135, 358/136; 375/27; 348/398, 402, 410, 414, 416, 417; H04N 7/13, 7/37

[56] References Cited

U.S. PATENT DOCUMENTS

| | | |
|---|---|---|
| 4,394,774 | 7/1983 | Widergren et al. |
| 4,477,829 | 10/1984 | Ziman et al. |
| 4,493,105 | 1/1985 | Beall et al. |
| 4,558,350 | 12/1985 | Murakami |
| 4,559,350 | 12/1985 | Wehinger et al. |
| 4,622,579 | 11/1986 | Starck |
| 4,665,436 | 5/1987 | Osborne et al. |
| 4,670,851 | 6/1987 | Murakami et al. |
| 4,698,689 | 10/1987 | Tzou |
| 4,704,628 | 11/1987 | Chen et al. |
| 4,710,810 | 12/1987 | Koga |
| 4,710,812 | 12/1987 | Murakami et al. |
| 4,723,161 | 2/1988 | Koga |
| 4,743,100 | 5/1988 | Wakada et al. |
| 4,782,387 | 11/1988 | Sabri et al. |
| 4,791,654 | 12/1988 | DeMarca et al. |
| 4,805,017 | 2/1989 | Kaneko et al. |
| 4,809,067 | 2/1989 | Kikuchi |
| 4,821,119 | 4/1989 | Gharavi |
| 4,829,376 | 5/1989 | Hammer |
| 4,868,653 | 9/1989 | Golin et al. |
| 4,878,230 | 10/1989 | Murakami ................ 375/27 |
| 4,887,151 | 12/1989 | Wataya |
| 4,910,608 | 3/1990 | Whiteman et al. |
| 4,920,426 | 4/1990 | Hatori et al. |
| 4,922,341 | 5/1990 | Strobach |
| 4,930,013 | 5/1990 | Leaning |
| 4,933,761 | 6/1990 | Murakami |
| 4,947,447 | 8/1990 | Miyaoka et al. |
| 4,951,140 | 8/1990 | Ueno et al. |
| 4,953,023 | 8/1990 | Kondo |
| 4,963,030 | 10/1990 | Makur |
| 4,969,039 | 11/1990 | Koga et al. |
| 4,979,039 | 12/1990 | Kisor et al. |
| 4,987,480 | 1/1991 | Lippman et al. |
| 4,987,490 | 1/1991 | Ohta |
| 4,989,089 | 1/1991 | Chantelou et al. |
| 5,003,377 | 3/1991 | Lippman et al. |
| 5,005,206 | 4/1991 | Naillon et al. |
| 5,008,747 | 4/1991 | Carr et al. |
| 5,010,401 | 4/1991 | Murakami et al. |
| 5,016,010 | 5/1991 | Sugiyama |
| 5,021,879 | 6/1991 | Vogel |
| 5,021,891 | 6/1991 | Lee |
| 5,030,953 | 7/1991 | Chiang |
| 5,134,475 | 7/1992 | Johnston ................ 358/136 |
| 5,136,374 | 8/1992 | Jayant ................ 358/136 |
| 5,172,228 | 12/1992 | Israelsen ................ 358/86 |

*Primary Examiner*—Howard W. Britton
*Attorney, Agent, or Firm*—Sughrue, Mion, Zinn, Macpeak & Seas

[57] ABSTRACT

A coding technique for high-definition television signals involves splitting the luminance signal into four sub-bands using a sub-band encoder and separately encoding each sub-band using a simplified vector quantization technique. The characteristics of each respective simplified vector quantization encoder can be matched to the characteristics of the respective sub-bands.

16 Claims, 4 Drawing Sheets

FIG. 1 CASEBOOK OF BASIC VECTORS FOR SVQ

HDTV ENCODER

INTERFRAME ENCODER

INTERFRAME DECODER

CODING TECHNIQUE FOR HIGH DEFINITION TELEVISION SIGNALS

FIELD OF THE INVENTION

The present invention relates to the broadcasting of image signals, such as high definition television TV signals. Specifically, the invention involves a coding technique for transforming analog television signals into a digital bit stream made up of codewords for transmission. At the receiver end, the received digital bit stream is decoded back into TV signals.

BACKGROUND OF THE INVENTION

There are many ways to encode high definition television (HDTV) signals. These techniques can generally be classified as waveform coding, transform coding and vector quantization techniques.

Waveform coding techniques such as pulse code modulation (PCM) typically use a scalar quantizer to quantize analog samples. Additional steps may be employed to reduce the information that must be transmitted, such as sending only the difference of PCM samples, such a technique is known as differential PCM, or DPCM. Waveform coding is generally simple to implement, but not very efficient as far as bandwidth compression is concerned. An example of waveform coding is the KDD/Canon 140 Mbit/s HDTV Codec.

The transform coding techniques transform the image samples to the transform domain, achieving energy compaction. Scalar quantizers are designed for each individual coefficient depending on its energy and the sensitivity of the human visual system (HVS) to that coefficient. Most popular video coding systems at this time are based on variations of the Discrete Cosine Transform (DCT). Well designed transform algorithms achieve effective bandwidth compression while preserving good image quality. Examples of transform technique based codecs are Telettra's 68 Mbit/s HDTV codec and General Instruments's 15 Mbit/s Digi-Cipher HDTV codec.

Sub-band coding is a coding technique which divides the HDTV signal into many small bands. As most of the signal energy is concentrated in the low-frequency bands, more information bits are allocated to the samples in the low-frequency bands. Also, different bands have different signal characteristics, and so different techniques can be employed to encode each individual sub-band. Examples of sub-band coding include the 140 Mbit/s codecs by Bellcore and NTT.

Waveform coding, transform coding, and to some extent, sub-band coding are "symmetrical" algorithms in the sense that the complexity of the encoder and decoder is about equal. For most of the video transmission and storage applications, there is a far greater number of decoders required than there is encoders, because each receiver must have a decoder but only the broadcaster need have an encoder. Therefore, "symmetrical" algorithms may not offer the best solution from an overall system cost standpoint.

Vector quantization (VQ) basically quantizes a group of samples at one time. VQ has the advantage that only a table look-up operation is needed to decode the signal, leading to an extremely simple decoder. However, it generally suffers from relatively poor quality. In addition, the encoder, which must search through a codebook to find the best vector to represent a group of samples, is generally very computationally intensive.

For high-quality television signals, HDTV in particular, real-time encoding requires extremely complicated hardware. Examples of vector quantization are disclosed in copending, commonly assigned applications Ser. Nos. 07/732,024, abandoned, and 07/759,361, which are herein incorporated by reference.

SUMMARY OF THE INVENTION

An object of the present invention is to achieve an image signal coding technique which involves high compression ratios with very little quality degradation, and further has simple hardware construction.

A further object of the invention is to achieve considerable bandwidth compression with a coding technique even when the original signal is noisy.

The above objects are attained by creating a coding technique having the following characteristics.

A television signal coding method comprising the steps of:
(a) dividing a video signal into its luminance and chrominance components;
(b) dividing the luminance component into a plurality of sub-bands;
(c) simultaneously and independently performing the following coding on each sub-band:
  (i) dividing an image frame into a plurality of two-dimensional blocks, each block being composed of a predetermined number of pixels;
  (ii) forming a codebook containing a plurality of basic vectors corresponding to the most common edge patterns to which the human visual system is highly sensitive;
  (iii) comparing a block with said codebook;
  (iv) identifying the edge pattern having the closest correlation to the block;
  (v) generating a digital signal including a codeword corresponding to the results of said step (iv);
  (vi) repeating said steps (iii) through (v) for each of said plurality of blocks;
(d) simultaneously coding said luminance component; and
(e) combining the thus-coded luminance and chrominance components into a single bit stream for transmission.

DETAILED DESCRIPTION OF THE PREFERRED EMBODIMENTS

The preferred embodiments of the present invention will now be described with reference to the above-mentioned figures.

Simplified Vector Quantization (SVQ)

The present invention involves an improved coding technique for use, for example, with analog television signals which are to be broadcast to a plurality of receivers. The analog TV signals are transformed into a digital bit stream made up of codewords by the coder. The coder involves a vector quantization scheme which is different from the conventional vector quantization schemes discussed above, in that in the new vector quantization scheme, a very high quality picture can be encoded with very simple processing at relatively low bit rates. The encoding process is considerably simpler than the traditional vector quantization which requires a larger codebook and thus intensive computation. The quality is also substantially better than what normally can be achieved by traditional vector quantization techniques with reasonably sized codebooks.

According to the present invention, the codebook is greatly reduced in size. Specifically, the codebook only includes codewords which relate to image patterns to which the human visual system is highly sensitive and which occur often in typical images. The sample codebook shown in FIG. 1, covers the most common edge patterns to be used. Each of these patterns is a separate basic vector used in the quantization. This type of quantization will be called hereinafter "simple vector quantization" (SVQ).

The basic approach of the SVQ technique will now be described. A single frame of a video signal can be modeled as a raster of pixels. The pixels are arranged in a two-dimensional array. If the raster is partitioned into a large number of small square blocks, each containing, for example, 4×4 pixels, monochrome images quantized to 8 bits per pixel would normally require 128 bits to represent the block without compression. However, the information of user interest in such a small block can be classified into only a few two-dimensional image patterns.

Figure 1:
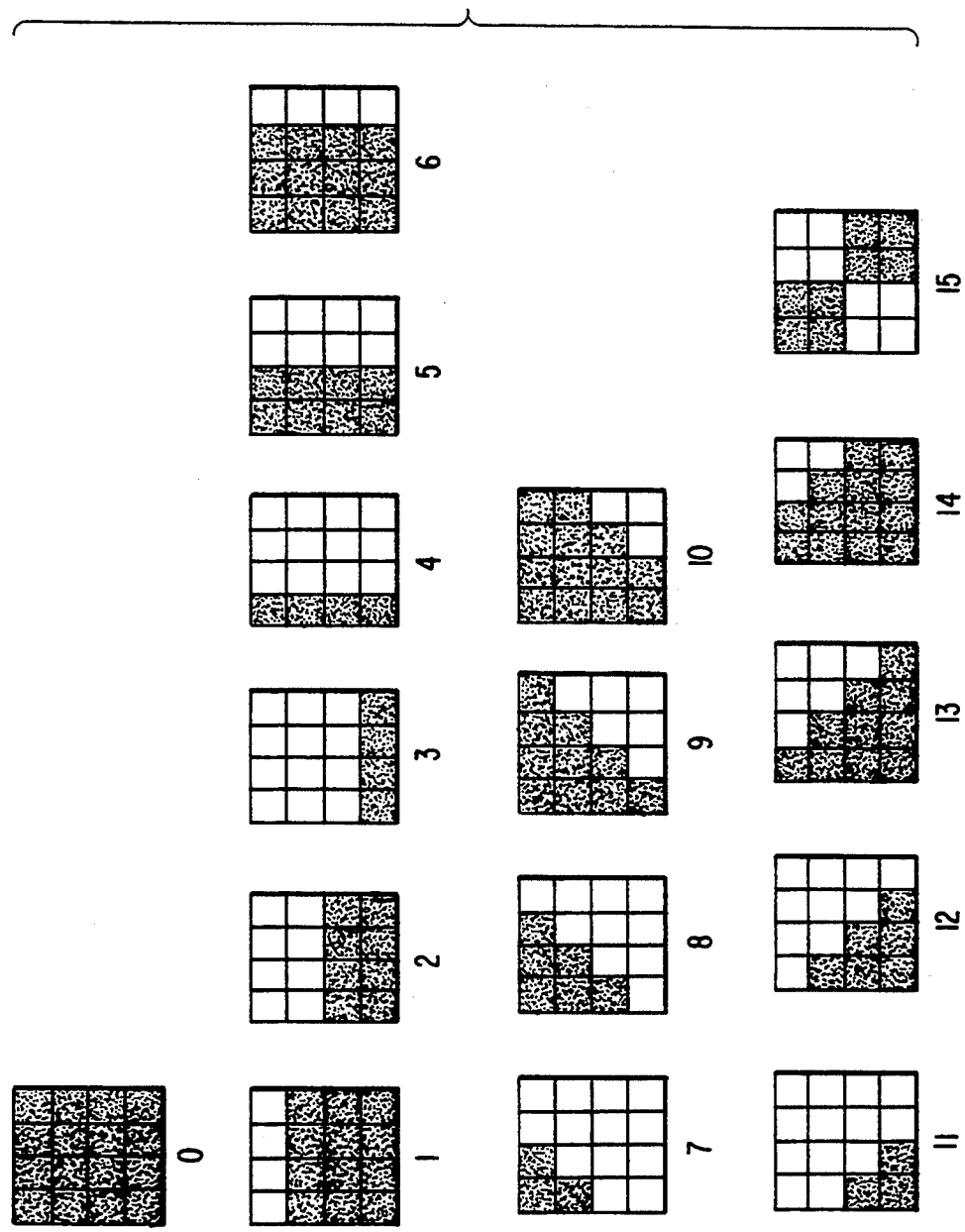
FIG. 1 represents a codebook of basic vectors for the SVQ coding technique of the present invention.

In a typical television signal, Applicants have found that the information of perceptual significance to humans in such a block can essentially be represented by 16 patterns and up to 2 gray scale values (see FIG. 1). These patterns include a simple square labelled 0 in FIG. 1 which is all of the same color. This represents a DC value and is a class 0 pattern of constant intensity. This is also referred to as the DC class. This pattern represents low-frequency areas in the image.

A straightforward compression technique involves the selection of the best approximation of the input block out of the codebook of candidate patterns. The technique involves the following steps:
1. Start with the first pattern in the codebook.
2. In accordance with the pattern orientation of this first pattern, compute two means from the 16 sample intensities (for all classes except the DC class—only one mean is calculated for the DC class).
3. Create a 4×4 block in which each of the 16 pixels has an intensity equal to the appropriate mean. For example, for class 1, the top four pixels will be filled with one mean value and the bottom 12 blocks will be filled with the other mean value.
4. Compute the distortion between the created block and the actual input block.
5. Repeat steps 2–4 for all the patterns in the codebook.
6. Choose the pattern which yields the minimum distortion.

The codeword that is transmitted is as follows. First, a small number of bits, for example, 4 bits, would be used to designate which of the 16 patterns of the codebook is closest to the block of the input analog TV signal. For example, for the DC class pattern, a particular 4 bit sequence would be chosen for the beginning of the codeword make-up. Next, parameter values would be added to the codeword to complete the make-up. The parameter values for the DC class would be the mean of the block, that is, the mean of the intensity of the block. For classes 1 to 15 two means will be calculated, a mean for each of the two areas of the block. The different areas of the blocks are designated by different colors in FIG. 1. As shown in FIG. 1, for the simplified codebook involved with the present SVQ method, each block has only two areas of intensity difference. The invention is not limited to this embodiment, however. Specifically, larger codebooks are also contemplated.

In a situation in which there is an edge in the image, the mean value of each area separated by the edge will be calculated and added as parameters to the end of the first 4 bit segment making up the codeword.

Each block of an incoming analog TV signal frame is encoded by matching it up with the closest one of the basic vectors in the simplified codebook shown in FIG. 1.

The non-DC classes of basic vectors of FIG. 1 will now be described, these are classes 1–15 and involve two-mean patterns (i.e., the edge is modeled as a step change in intensity). Classes 1–3 involve horizontal edge patterns in which the two sections of the block having different intensities are laid out horizontally with respect to each other. That is, if a vertical line is drawn through the block, the vertical line will cross two areas, each area having a different intensity.

Classes 4–6 of FIG. 1 show basic vectors having vertical edges. For these classes, the change of intensity is the opposite as that described above with respect to the horizontal edges. That is, if a horizontal line is drawn across the block, the horizontal line will intersect two areas, each area having a different intensity. Classes 7–15 involve diagonal edges, and a diagonal line separates areas of different intensities. That is, in order to stay within a single intensity area of the block, a line must follow a diagonal direction.

For the classes 1–15, these classes require two scalar parameters, each one representing the mean of one of the two disjoint regions of the block. These parameters must be transmitted along with the identifier of the pattern, as discussed above. To summarize, the first few bits of the codeword involve an identifier to identify which of the 16 classes of the simplified codebook most nearly represents the corresponding block of the input analog video signal frame. The next group of bits is used to represent the mean of one of the areas of the block (assuming that the DC class is not involved) and the second group of bits represents the mean of the other disjoint area of the block. The mean is calculated by adding up all of the intensity levels of the pixels of each disjoint area and dividing this sum by the number of pixels in the disjoint area. If the DC class is involved, only one group of bits will follow the identifier, and this group of bits will represent the estimated DC value of intensity.

Further, if an edge pattern (classes 1–15) is involved, an additional number describing the step size of the edge will be required to be added to the end of the codeword. Since typical pictures contain a large number of DC blocks, the average number of bits needed to describe a block can be reduced to less than 16 bits with this scheme alone, corresponding to a compression greater than 8 to 1. In conjunction with a standard entropy coding technique such as Huffman coding, a 12-16:1 compression can easily be achieved. The block size can be as small as 2×2 and can be enlarged to greater than 4×4. The smaller the block size, the better the quality. The bigger the block size, the higher the coding efficiency. Also, the quality can be improved by adding other visually perceptible, but less significant patterns. With entropy coding, a much larger codebook consisting of 128 or more patterns can be used without increasing the information rate significantly.

The high resolution information on the edges is preserved by the SVQ technique. Also, the encoding process involves a pattern matching operation and computations of a DC value and a step size (if an edge pattern is selected). The computation requirement of this encoding process is still less than that required by two-dimensional DCT for the same size block. The decoding process involves only a table look-up of the pattern and simply filling the patterns with the appropriate pixel value(s).

The SVQ technique is a spatial coding technique which utilizes the properties of the human vision system to compress the information bandwidth with a fairly simple encoder and an extremely simple decoder. The technique by itself can achieve a coding efficiency of 1 bit per pixel for a typical video picture with negligible degradation in image quality. It can also be used in conjunction with other coding schemes such as conditional replenishment, motion compensation, or subband coding to achieve further bandwidth compression, as will be described later below.

The baseline codebook of the SVQ technique consists of edge patterns which makes it eminently suitable for interframe coding and intraframe coding of edge-like patterns. More complex features like textures and gradients can also be coded with high fidelity using an expanded codebook. The codewords are parameterized by adding additional scalars, thereby greatly increasing the codebook size and improving the quality while minimizing encoder complexity.

Because of the simplicity of the VQ decoder, vector quantization is an appealing coding technique for the broadcast environment. Since VQ encoder complexity is usually quite high, conventional VQ techniques use a codebook with a limited number of codewords to reduce the complexity of the search for the best codeword. However, codebooks are typically designed using mean square error as a criterion, which causes visually important features such as edges to be degraded.

The SVQ technique was developed to reduce transmitter complexity without sacrificing quality. The codewords-patterns chosen are those to which the human visual system is highly sensitive and which occur often in typical images. Techniques like the DCT technique have been observed to be ineffective in coding motion-compensated frame difference signals, which are usually impulsive, edge-like signals. Since SVQ can code edges with high fidelity, it appears to be particularly appropriate for these signals.

The size of the SVQ codebook is $15 \times (256)2 + 256 = 2^{20}$. However, since the codebook is parametric, its size should not be compared to that of a conventional VQ codebook. One of the advantages of SVQ is that it can have a large codebook, as computed above, without the correspondingly large search complexity. For the codebook shown in FIG. 1, the nearest codevector can be found (using an exhaustive search) by computing only 16 distortions (the number of classes shown in FIG. 1).

An example will now be given of the SVQ coding. If an input 2×2 block, which is a portion of the video signal frame of the analog TV signals being input to the coder, has values of 2, 4, 6 and 8 as it enters the coder, and it corresponds most closely to the DC class of FIG. 1, the SVQ coder will find the mean of this block, which is 5, and place a 5 in each of the four areas of the block and transmit the block with all 5's in it.

Note that the codebook described above is only a sample codebook described for illustrative purposes. The HDTV codec actually uses a codebook with 128 basic two-mean edges. More complex codebooks (i.e., with codevectors parameterized by more than two values) can also be designed.

A fast search technique will now be described for quickly determining which of the 16 basic vectors in FIG. 1 is most similar to an input block of a video signal frame of the analog TV signal. This search technique is much quicker and more efficient than the exhaustive search technique described above.

As mentioned above, 128 classes are used in Applicants' experiments, which would require computing 128 distortions if an exhaustive search is used to find the best codevector and parameters. While the complexity of an exhaustive search is much lower for SVQ than for conventional VQ, it still is high. A fast search method has been developed which requires the computation of only a few distortions per 4×4 block.

The advantages of the fast search algorithm are that it is extremely simple and the computational complexity is independent of the codebook size. In general, its performance is almost as good as that of an exhaustive search. The fast search algorithm finds a two-mean edge pattern which can match the 4×4 input block; however, it does not guarantee that the closest pattern will be found. In those infrequent cases when the closest pattern is not found, distortion is usually quite close to the global minimum.

The fast search uses a look-up table which is created from the pattern codebook in an initial training phase. The look-up table is stored in a memory in the encoder. It is assumed that the pattern codebook is ordered according to the frequency of occurrence of the patterns in the training sequence. The generation of the look-up table is first described.

1. Take a 4×4 pattern in the codebook. Replace all the pixels which have one value with a '0' and all the other pixels with a '1'.
2. Create a 16 bit word by scanning the block from left to right and top to bottom.
3. Repeat steps 1 and 2 for all the patterns in the codebook.

The codebook now consists of 16 bit codewords. The look-up table consists of $2^{16}$ input value entries corresponding to $2^{16}$ possible 16 bit codewords. For each of the $2^{16}$ 16 bit words, the codewords from the codebook which are closest in Hamming distance to it are found. In case there are multiple codewords at the minimum Hamming distance, the codeword which occurs first in the codebook is chosen. This codeword becomes the output entry in the look-up table corresponding to the 16 bit word. Therefore, the input entries of the look-up table are mutually exclusive and there are $2^{16}$ of them and they represent all possible bit combinations of a 16 bit word. The output entries of the look-up table can assume 16 different values, the values of the 16 bit words generated from the codebook.

Once the look-up table is formed, the fast search is performed as follows.
1. For a given input block, subtract the block mean from every sample of the block.
2. Replace the positive samples by 1's and the negative samples by 0's and construct a 16 bit word by scanning the input block from left to right and top to bottom.
3. Find the output entry in the look-up table which corresponds to this input 16 bit word.

This codeword will be the pattern used to code the block.

There are two reasons why the fast search may fail in finding the closest single edge pattern. If the input block has an ill defined edge, then the thresholding operation performed by the fast search may yield a word which is very different from the best codeword for the block. This is not the primary reason for the sub-optimality of the algorithm because, in any case, ill defined edges cannot be coded adequately by a single edge pattern. A more important reason is that the word obtained after thresholding may be at the minimum Hamming distance to several codewords and since the first codeword in the codebook is the one chosen (i.e. statistically more probably codewords are given preference), it may not be the best codeword. There are two ways to alleviate this problem. The dimensionality of the codebook can be increased so that every 16 bit word is associated with up to, say, 4 codewords which are at the minimum Hamming distance from it. The encoder would then evaluate the distortion incurred by coding the block with each one of the 4 codeword patterns and would select the pattern which yields the minimum distortion. The other approach which does not increase the size of the codebook or the complexity of the encoder, is to choose the best codeword (out of all those at the minimum Hamming distance) at the look-up table creation stage using additional criteria. The 4×4 block nature of the codewords may help in finding the best codeword.

Now that the SVQ technique has been explained, a second embodiment of the invention will be described in which the SVQ technique is combined with sub-band coding in order to provide a composite coding scheme which provides further advantages as will be described below.

SVQ combined with sub-band coding

Applying the SVQ technique directly to an HDTV signal does not yield the most satisfactory results due to the high noise level present in most HDTV source signals. Thus, Applicants have found that by combining the sub-band coding scheme and the SVQ technique for HDTV coding, a higher efficiency and higher quality coding can be achieved.

As most of the noise in the HDTV signal is in the higher frequency bands, SVQ can code the low-frequency bands more efficiently once the signal is divided into various sub-bands. Also, specific SVQ patterns can be designed to better fit the characteristics of the individual sub-bands.

Sub-band coding involves partitioning the input video signal into a number of disjoint sub-bands, each of which can be coded separately to optimally exploit the properties of the human visual system. Good results were obtained by Applicants by partitioning the image into 7 sub-bands and using differential pulse code modulation (DPCM) for the lowest frequency band and PCM with a coarse quantizer for the other bands. HDTV sequences have significant noise power at high frequencies and coding schemes based on sub-band coding can be made robust to source noise fairly easily. Robustness can be achieved simply by using coarse quantization in the higher sub-bands.

Figure 2:
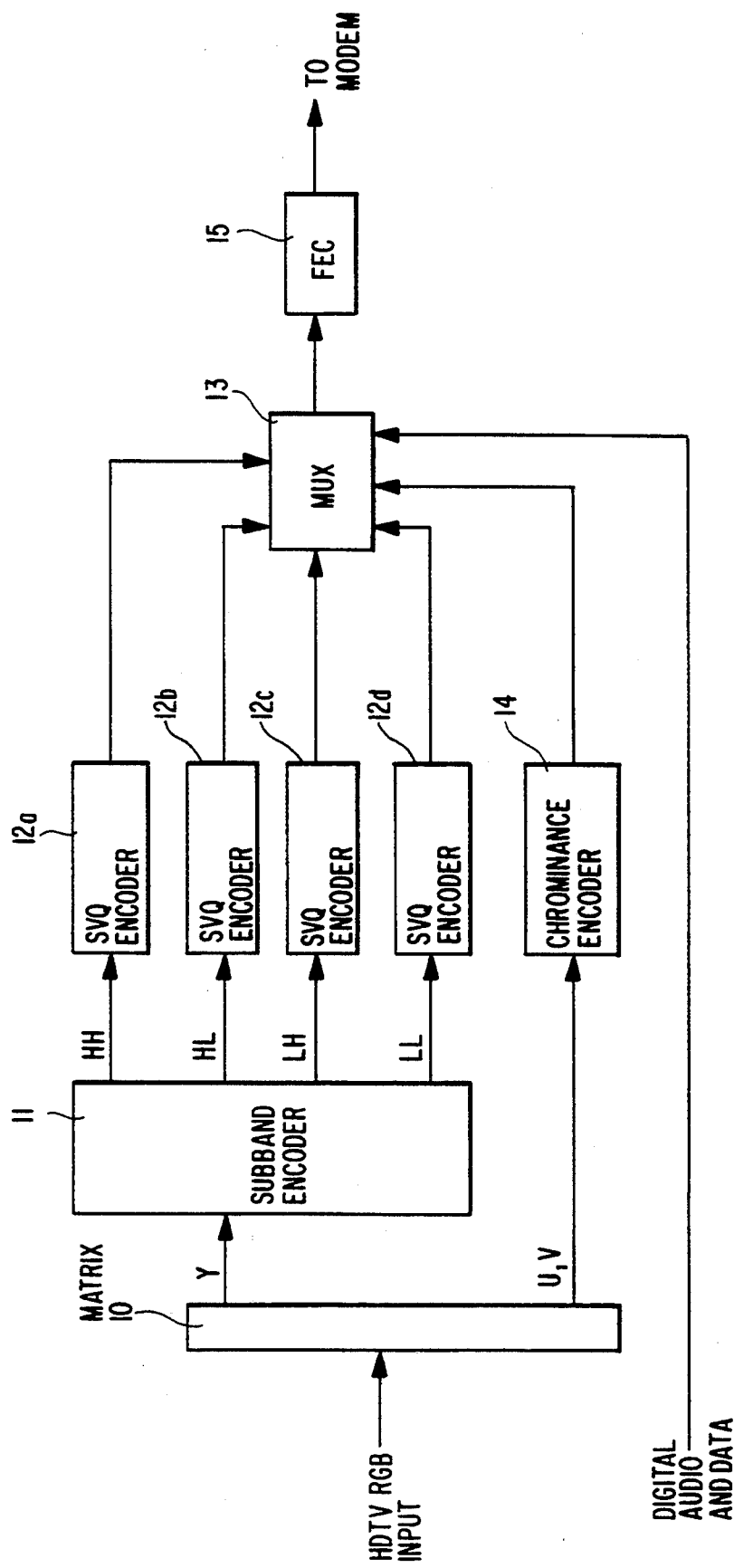
FIG. 2 represents the encoder of the present invention.

The HDTV encoder of this embodiment will now be described with respect to FIG. 2. In FIG. 2, the input HDTV RGB video signal is input to a matrix 10. The analog HDTV signal enters the HDTV encoder in the form of red, green, blue (RGB) components. At the matrix 10, the input signal is separated into a luminance signal Y and chrominance signals U, V. The signals are also band-limited. In a specific design example, these components were limited to 24 MHz and 6 MHz, respectively, then sampled at 54 MHz and 13.5 MHz, respectively, and quantized into 8 bits each.

The luminance signal Y is then divided into four sub-bands, the low-horizontal low-vertical (LL), low-horizontal high-vertical (LH), high-horizontal low-vertical (HL) and high-horizontal high-vertical (HH) bands. Each of the sub-bands are then coded using SVQ. A sub-band encoder 11 is used to separate the luminance signal Y into the four sub-bands described above. Each of the sub-bands are fed into a separate SVQ encoder 12. The outputs of the respective SVQ encoders 12 are sent to a multiplexer (MUX) 13.

In one embodiment, the LL band is coded with patterns in 2×2 blocks, whereas all other bands are coded with 4×4 blocks. Use of the small 2×2 blocks ensures that the most critical LL band is coded with minimum distortion. In a second embodiment, the LL band is normally coded with 4×4 blocks. When coding with 4×4 blocks yields unacceptable distortion, 2×2 blocks are used. Because of significant noise presence in the HL and HH band, a noise coring will be applied to the signal before coding. Noise coring is equivalent to the use of a dead zone around 0. Since signals in those bands have negligible DC values, noise coring introduces little distortion while reducing the noise level significantly. Also, because the signal characteristics of each individual sub-band are different, SVQ entropy encoders are individually optimized to take advantage of the unique characteristics of the sub-bands.

The chrominance signals are not divided into sub-bands. These signals are vertically filtered and decimated, and then coded by the SVQ technique using the chrominance encoder 14. The output of the chrominance encoder is also fed to the multiplexer 13. A digital audio signal and other data, to be transmitted simultaneously with the HDTV signal, is also input to the multiplexer 13. The output of the multiplexer 13 is subjected to forward error correction by unit 15 and then transmitted to the modem for broadcasting.

Figure 3:
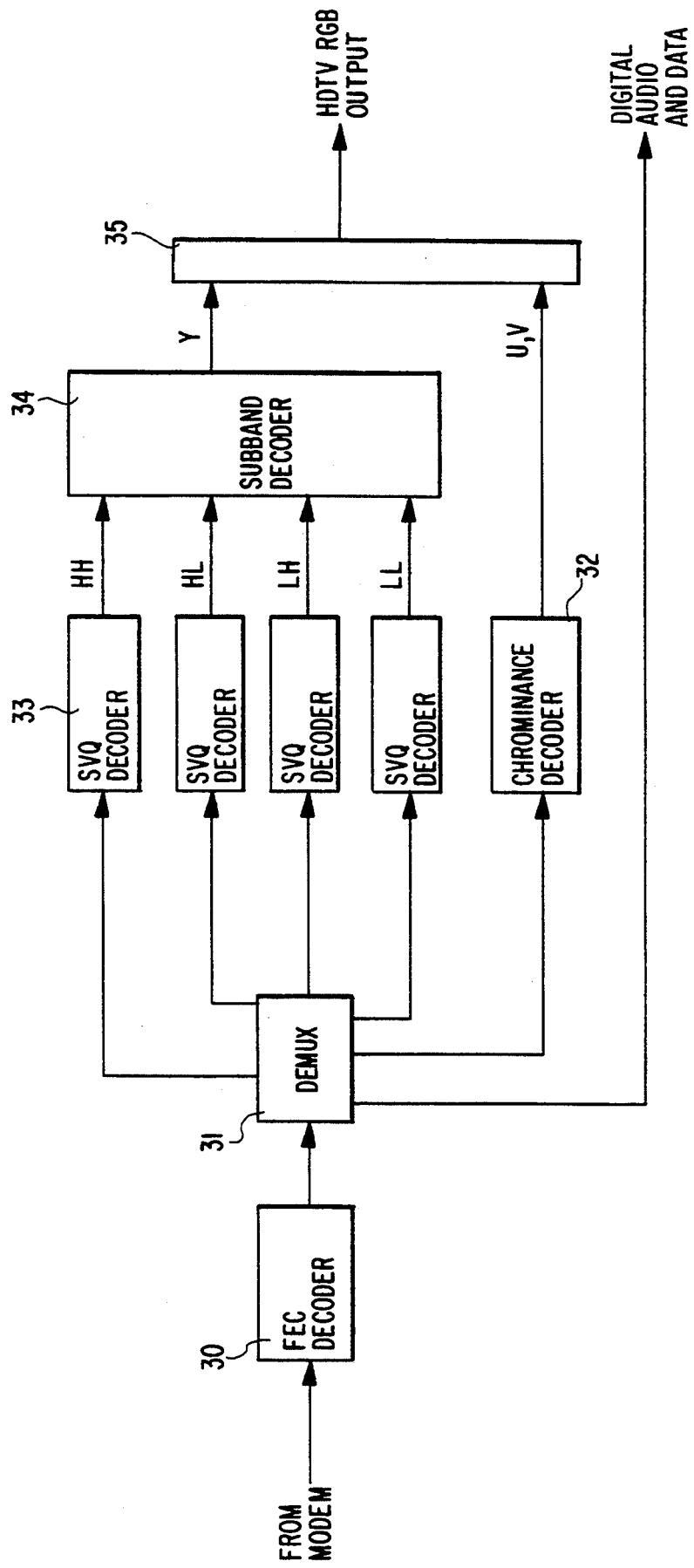
FIG. 3 represents the decoder of the present invention.

At the receive side, the receive data will first be put into a buffer and then subjected to forward error correcting decoding by decoder 30 in FIG. 3. The output of decoder 30 is sent to the multiplexer 31 which separates the received signal into the four separate luminance sub-bands, a chrominance signal, and digital audio and data. The chrominance signal is sent to chrominance decoder 32 and the four luminance sub-bands are sent to four respective SVQ decoders 33 where they are decoded back into the sub-bands HH, HL, LH and LL described above. The signals are entropy decoded and SVQ decoded into individual 4×4 (or 2×2) blocks using look-up tables. The HDTV signal will then be reconstructed by interpolating the individual sub-band signals and superimposing them together. Sub-band decoder 34 superimposes the signals back into the luminance signal Y which is sent to matrix 35. The chrominance signal output from the chrominance decoder 32 is also input to the matrix 35 and the HDTV RGB output signal is reconstructed at the output of matrix 35.

This general scheme can be used with more than four sub-bands. However, an important advantage of using four sub-bands is that an NTSC-equivalent signal is automatically available in the form of the LL band luminance signal. Therefore, it is easy to provide an NTSC signal directly from the received signal. This is useful in situations when it is desired to transmit both an HDTV signal and an NTSC signal simultaneously. For example, some users may not be able to view the HDTV signal but can only view the NTSC signal.

A variety of sub-band filter banks (quadrature modulations filters (QMFs) and perfect reconstruction filter banks) were used by Applicants in experiments, and are described in COMSAT Laboratories, "Phase 1 Final Report for the Flexible Rate HDTV Codec" NASA Contract NASW 4512, May 23, 1991. Both 2- and 16-tap QMF filters were found to be suitable, the 2-tap because of its simplicity and reasonable performance and the 16-tap for its performance. The higher tap filter would be preferable for a noisy source, since the sub-bands would be more isolated (less aliasing). A higher tap filter would also be preferable if the low band were to be used for extracting an NTSC compatible channel, again because of less aliasing.

Because of their complexity, perfect reconstruction filter banks were not chosen. The perfect reconstruction property is not very important since the coding distortion is significantly higher than the QMF filter bank distortion. Moreover, the QMF filter banks can be implemented much more efficiently than the perfect reconstruction filter banks.

While SVQ is more efficient that either PCM and DPCM in most cases, it is particularly susceptible to high-frequency noise. Combining sub-band coding and SVQ coding results in a robust and efficient coding scheme.

Because the signal characteristics of each individual sub-band (HH, HL, LH and LL) are different, the SVQ codebooks, fast search look-up tables, and entropy coders are individually optimized to exploit the unique characteristics of each sub-band.

Motion estimation and compensation will now be described. With image signals, there is a certain amount of repetition of data, for example, if an image does not move for a long time, the data will remain constant. Also, there are certain instances when certain parts of the data of an image remain constant while other parts move. In these situations, it is efficient to only send information relative to the moving parts, there is no need to continuously send information as to parts that remain the same.

Because of sub-band coding there are several methods of motion estimation and compensation, as discussed below. The first and most straight-forward method is to perform the motion estimation and compensation prior to sub-band filtering. The sub-band SVQ coder will then have as its inputs either a block of the motion-compensated frame difference or a block of the current frame if the motion estimation has failed for any reason (scene change, image area occlusion or uncovering, nonuniform motion, etc.). The disadvantage of this approach is that the motion estimator must operate at an input rate equal to the HDTV sampling rate of 54 MHz or greater. Currently available chips cannot operate at this rate and several chips will have to be time multiplexed to perform motion estimation. In this chips, the search area is limited to about $\pm 8$ pels in both directions; this displacement may be insufficient for HDTV frames.

The second approach is to perform the motion estimation and compensation on each of the bands separately. Single-chip motion estimators can be used in each band since the sampling rate is one-fourth of the HDTV sampling rate. The search area will be increased by a factor of 2 in the horizontal and vertical directions. At the encoder and decoder, each frequency band will require a one-fourth frame memory to store the previous frame. The memory requirement will therefore be the same as in the first case.

A more appealing approach may be to perform motion estimation only in the LL band. This will require only one motion estimation chip to be used. Another advantage is that a significant portion of the source noise will have been filtered out, thereby increasing the accuracy of the motion estimates. For the other bands, there are two alternatives. The first is to perform only intraframe coding on these bands. This will reduce the memory required and will simplify the implementation at the expense of a slight increase in the bit rate. Since intraframe coding is performed in the higher bands, the coding distortion in these bands in static image areas will not decrease with time. The second alternative is to use the motion vectors from the LL band to compensate the frames in the other bands, thus performing interframe coding in all the bands. The assumption is that the motion vectors obtained from the LL band are usually valid for the other bands. Although this approach has the potential of reducing bit rate and improving quality, it is more complex than the first alternative.

Figure 4:
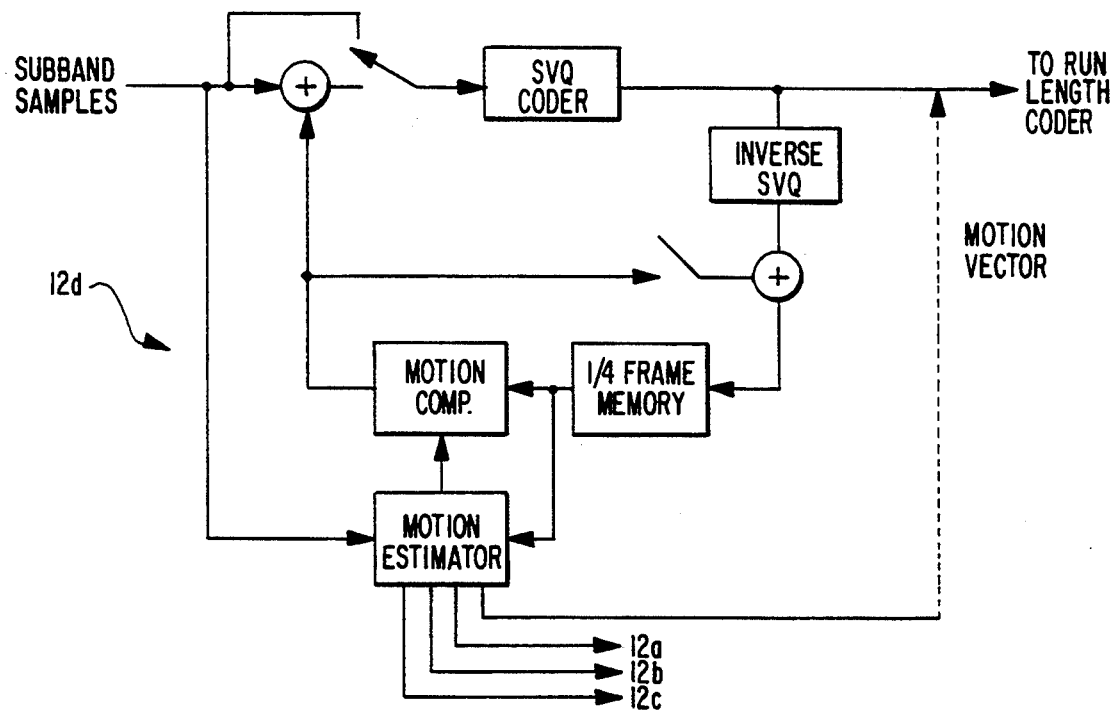
FIG. 4 represents an interframe encoder of the present invention.
Figure 5:
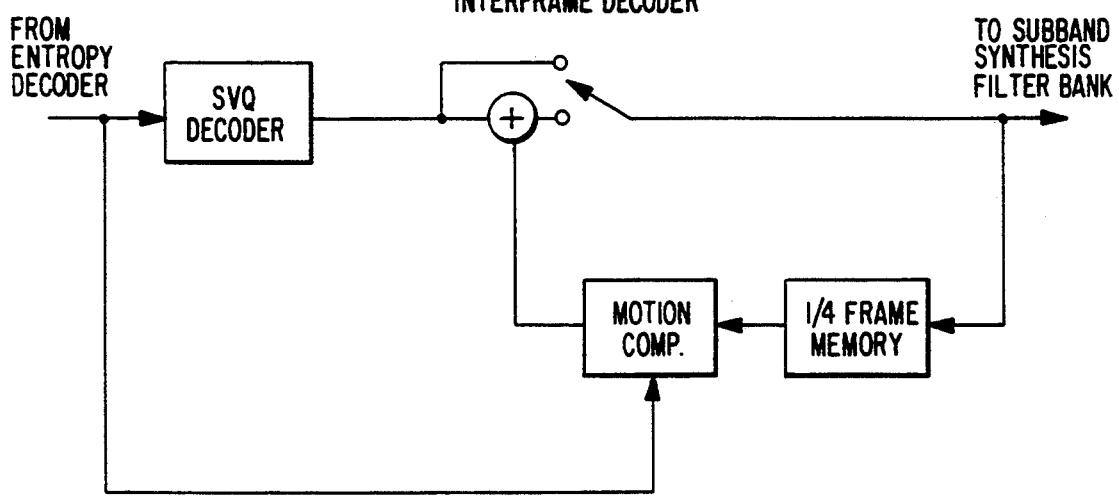
FIG. 5 represents an interframe decoder of the present invention.

In order to realize a simpler motion estimation module, motion estimation was performed only in the LL band, as shown in FIGS. 4 and 5, which are interframe encoder and decoder block diagrams, respectively. A block size of $8 \times 8$ was chosen as a reasonable compromise between reducing the overhead for transmitting the motion vectors and obtaining more accurate motion estimates. Simulations were performed to evaluate the two alternatives, intraframe coding or interframe coding in the higher bands. It was found that interframe coding in the high bands did not yield a significant reduction in bit rate for the original HDTV sequences tested. This was due to the high-frequency noise in the image sequence which was accentuated by the frame differencing operation. The observation that the interframe coding approach could reduce the bit rate if the input images had higher signal-to-noise ratios was confirmed for the MIT sequence, where coding the frame difference signal was instrumental in decreasing the bit rate by a factor of two or more in all the bands.

The U and V color difference frames will use the motion estimates obtained in the LL band. Each $8 \times 8$ block in the LL band corresponds spacially to one $4 \times 8$ chrominance block because the chrominance signal is subsampled horizontally by a factor of two as compared to the LL signal. Consequently, a horizontal displacement of 1 pixel in the LL band corresponds to 0.5 pixel displacement in the chrominance bands. To avoid the complication of interpolation, the horizontal displacement estimates from the LL band will be halved, truncated to the nearest integer, and used to compensate the U and V frames.

By combining the coding approach with motion compensation and conditional replenishment, and other frequently used techniques, the information bit rate for digital television signals can be reduced. Applicants' experiments indicate that the motion estimation for motion compensation suffers from inaccuracy in the presence of source noise. The simple technique discussed above in which motion detection only in the LL sub-band is used solves this problem. The resultant motion vector will be used to compensate all sub-bands, if needed. This also allows for the use of existing VLSI circuits designed for normal television signals. Although the motion vector detected will have ±1 pixel uncertainty, the results are generally better than those obtained using the original HDTV signals. Since most of the information is in the LL band, applying motion compensation and conditional replenishment to only the LL band will have the advantage of hardware savings at the expense of a possibly slight increase in the information bit rate. Also, the information in the high-frequency bands is generally less correlated temporally.

When applying motion compensation and conditional replenishment to a combination of sub-bands, each sub-band will have its own frame memory in the encoder to derive the frame difference signals for the individual bands after motion compensation. In the preferred embodiment, the motion compensation is derived from the motion estimate of the LL band. Similarly, at the receiver, each component will need frame memory to reconstruct the current frame in its own band from the output of the look-up table.

A high-definition television coding scheme based on a newly developed simplified vector quantization (SVQ) technique used in conjunction with sub-band coding has been described above. The coding algorithm is robust to source noise and capable of providing very high quality at a range of transmission data rates practical for satellite transmission. In addition, an NTSC compatible channel is automatically available as one of the sub-bands. The decoding algorithm is extremely simple and well-suited for point-to-multipoint applications.

Recent advances in digital image coding in very large scale integration technology (VLSI) have enabled the compression of HDTV signals to very low bit rates. The low-complexity vector quantization based HDTV coding scheme discussed above yields very high-quality HDTV transmission at bit rates of 20 Mbit/s and above.

By combining SVQ coding and sub-band coding, each sub-band can be subjected to a different type of SVQ coding to take advantage of the qualities of each sub-band. Specifically, since the higher frequency sub-bands consist primarily of edge-like signals, the SVQ coding scheme is particularly effective. The all important low-frequency band is coded with high fidelity using the baseline codebook and additional codewords when required.

Simulation results will now be described. The sub-band SVQ coding algorithm has been simulated on HDTV motion sequences up to 100 fields long using an HP-700 workstation coupled to an in-house-developed HDTV motion sequence capture and display facility. The source is a SONY analog HDTV tape recorder which produces 1,125-line interlaced HDTV frames at a frame rate of 30 Hz. The analog HDTV luminance and chrominance signals are sampled at rates of 54 and 13.5 MHz, respectively. The revolving toy sequence has many intricate details and rapid motion. The source S/N is only about 36 dB, and the results indicate the robustness of the coding algorithm. The coded sequences are free from motion artifacts and the edges are coded with fidelity. Since the sampling rate is 54 MHz and the active total pel ratio is approximately 0.76, the active sampling rate is about 41 MHz. The rate contribution due to the chrominance signals is less than 0.1 bit/pel. The MIT sequence is an artificially generated zoom and pan of several highly detailed objects. Very good quality images were obtained at less than 0.5 bit/pel for luminance with no coding or motion artifacts.

The results for intraframe coding and interframe coding using 2- and 16-tap filters are shown in Table 1.

TABLE 1

Results for the Sub-Band-SSVOC Scheme

| IMAGE SEQUENCE | INTRAFRAME | | INTERFRAME | |
|---|---|---|---|---|
| | BIT RATE (BITS/PEL) | S/N (dB) | BIT RATE (BITS/PEL) | S/N (dB) |
| Toy (2-tap) | 1.09 | 29.5 | 0.89 | 29.4 |
| Toy (16-tap) | 1.00 | 29.6 | 0.78 | 29.5 |
| MIT (2-tap) | 1.40 | 35.1 | 0.42 | 34.8 |
| MIT (16-tap) | 1.26 | 35.6 | 0.40 | 35.5 |

The invention is not to be limited by the above-described embodiments, but only by the spirit and scope of the appended claims.

What is claimed is:

1. A television signal coding method comprising the steps of:
   (a) dividing an image into a plurality of two-dimensional blocks, each block being composed of a predetermined number of pixels;
   (b) for each block exhibiting an intensity variation within that block, calculating first and second means values based on said variation;
   (c) calculating distortion values between said each block and a respective plurality of basic vectors in a codebook based on said first and second mean values, said vectors corresponding to the most common patterns to which the human visual system is highly sensitive;
   (d) identifying one of said vectors producing a minimum one of said distortion values as a selected pattern; and
   (e) generating a digital signal including a plurality of first bits representing said selected pattern, a plurality of second bits representing said first mean value and a plurality of third bits representing step size of a pattern edge in said selected pattern.

2. The method according to claim 1, wherein said predetermined number of pixels is adaptively varied inversely proportional to magnitude of said minimum difference.

3. The method according to claim 1, wherein each vector comprises n bits and there are less than $2^n$ vectors in said codebook.

4. A television signal coding method comprising the steps of:
   (a) dividing a video signal into its luminance and chrominance components;
   (b) dividing the luminance component into a plurality of sub-bands;
   (c) simultaneously performing the following coding on each sub-band;

(i) dividing an image into a plurality of two-dimensional blocks, each block being composed of a predetermined number of pixels;

(ii) for each block exhibiting an intensity variation within said block, determining a minimum difference between said block and codebook patterns permitting selection of one of said codebook patterns as a selected pattern using at least one mean value representing a corresponding each said block; and (iii) generating a digital signal including a plurality of first bits representing said selected pattern, a plurality of second bits representing said means value and a plurality of third bits representing step size of a pattern edge in said selected pattern;

(d) simultaneously coding said chrominance component;

(e) combining the thus-coded luminance and chrominance components into a single bit stream for transmission.

5. A method according to claim 4, wherein said predetermined number of pixels is adaptively varied inversely proportional to magnitudes of said distortion values.

6. A method according to claim 4, wherein said means value comprises first and second mean values and wherein said determining step (c)(ii) comprises the steps of:

(c)(ii)(1) calculating said first and second mean values based on said variation;

(c)(ii)(2) calculating distortion values between each said block and each of said codebook patterns based on said first and second mean values;

(c)(ii)(3) identifying the one of said codebook patterns producing a minimum distortion value corresponding to said minimum difference.

7. A method according to claim 4, wherein said determining step (c)(ii) comprises the steps of:

(c)(ii)(1) calculating mean intensity for each block and subtracting the mean intensity from every pixel intensity of the block;

(c)(ii)(2) replacing positive and negative values resulting from step (c)(ii)(1) with zeros and ones, respectively, to generate a resultant block representing said each block;

(c)(ii)(3) constructing a digital word by scanning said resultant block from left to right and top to bottom; and (c)(ii)(4) entering said digital word in a look-up-table relating Hamming distance between said digital word and codebook patterns so as to identify said selected pattern.

8. A method according to claim 4, wherein said television signal is a High Definition Television signal and wherein one of said sub-bands represents a NTSC luminance signal.

9. A method according to claim 4, wherein said step (b) further comprises dividing the luminance component into a first sub-band and a plurality of sub-bands based on frequency; and wherein said step (c) further comprises simultaneously performing interframe coding of said first sub-band and intra frame coding on each of said second sub-bands.

10. The method according to claim 4, wherein said coding recited in step (c) is interframe coding.

11. A method according to claim 4, wherein said plurality of vectors in said codebook comprise only basic vectors corresponding to the most common patterns to which the human visual system is highly sensitive, wherein each vector comprises n bits and there are less than $2^n$ vectors in said codebook.

12. A television signal coding method for compressing said television signal using a codebook comprising only two mean edge patterns to which human sight is highly sensitive, said method comprising the steps of:

(a) dividing an image into a plurality of two-dimensional blocks, each block being composed of a predetermined number of pixels;

(b) calculating mean intensity for each block and subtracting the mean intensity from every pixel intensity of the block;

(c) replacing positive and negative values resulting from step (b) with zeros and ones, respectively, to generate a resultant block representing said each block;

(d) constructing a digital word by scanning said resultant block from left to right and top to bottom; and (e) entering said digital word in a look-up-table relating a difference between said digital word and said patterns so as to identify a selected pattern; and (f) generating a digital codeword based on said selected pattern.

13. The method according to claim 12, wherein said difference corresponds to Hamming distance.

14. The method according to claim 12, wherein said digital codeword comprises a plurality of first bits corresponding to said selected pattern, a plurality of second bits representing at least one of mean intensity values in said block and a plurality of third bits representing edge step size.

15. The method according to claim 12, wherein said predetermined number of pixels is equal to an integer N greater than 1, and wherein look-up-table is formed by the steps of:

(g) for each of said patterns in said codebook, generating one corresponding N-bit word;

(h) generating a list of N bit entry words corresponding to $2^N$ possible N-bit words; and (h) correlating each of said N bit entry words with one of said patterns representing approximately minimum Hamming distance.

16. The method according to claim 15, wherein said patterns in said codebook are ordered based on frequency of occurrence.

* * * * *